Nov. 21, 1967  H. E. REICHART  3,353,519

ROTARY INTERNAL COMBUSTION ENGINE

Filed Nov. 26, 1965

*INVENTOR.*
HERMAN E. REICHART
BY

ATTORNEYS

United States Patent Office 3,353,519
Patented Nov. 21, 1967

3,353,519
ROTARY INTERNAL COMBUSTION ENGINE
Herman E. Reichart, 2810 W. Long Lake Road,
Bloomfield Hills, Mich. 48013
Filed Nov. 26, 1965, Ser. No. 509,870
7 Claims. (Cl. 123—12)

ABSTRACT OF THE DISCLOSURE

An engine of the rotary type is disclosed, in which a first rotor is radially outwardly slotted about its periphery at equally spaced points to provide combustion chambers, and a second rotor radially overlaps the first rotor, carrying a plurality of equally spaced, cylindrical piston members which sequentially enter into the combustion chambers upon ignition of the fuel, thus causing the second rotor to be driven by the first. The first rotor has individual ignition means, such as spark plugs housed therewithin, one for each combustion chamber; and the driving rotor also has fuel supply passages opening therethrough, these and the spark plugs being exposed in communication with the respective combustion chambers. Fuel enters the latter from the fuel supply passages, as the latter passes a fuel supply port on a fixed base plate; and the spark plugs are sequentially fired in passing an electrically energized terminal member on the last named plate.

---

Figure 1:
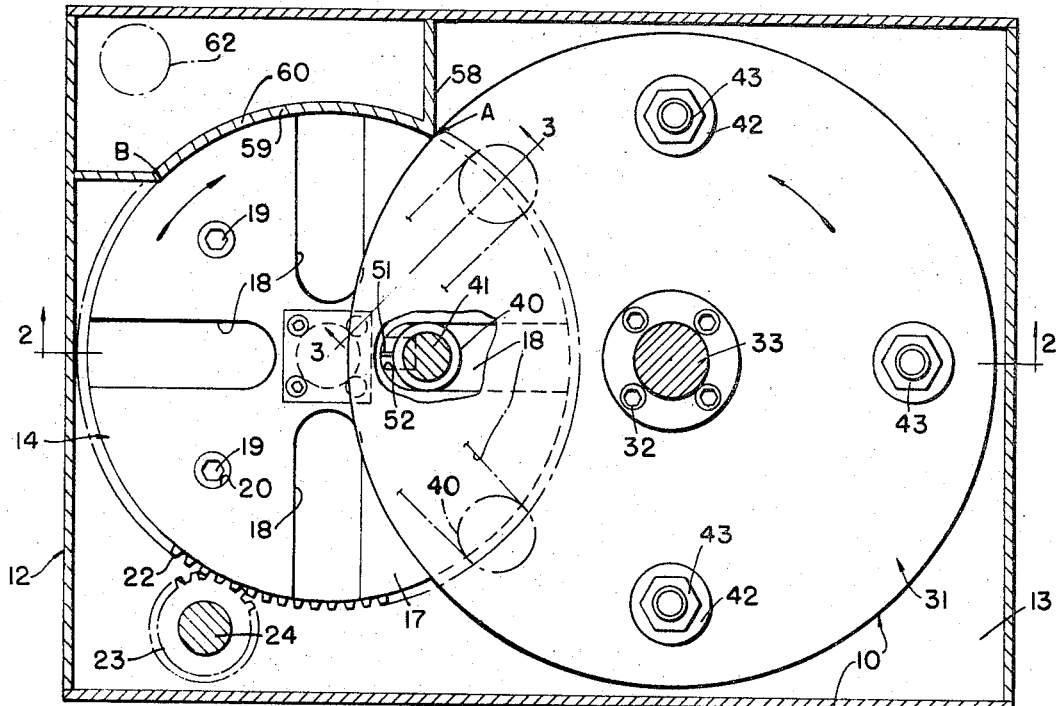

The present invention relates to an improved rotary internal combustion engine which is characterized by its great simplicity and minimum of moving parts, lending it to low cost of production, and which is extremely rugged and structurally stable, as compared with generally related types of rotary engines heretofore proposed by others.

Thus, for example, one such proposed prime mover features multiple sets of balls or spheres mounted by radial arms on parallel shafts, such balls operating into and out of rotatably mounted cylinders, of which one is a power cylinder. Another suggested design employs power rotors mounted on parallel axes about a central rotary unit, through which fuel is supplied to semi-spherical piston chambers on the rotors, ignition being through the agency of individual spark plugs for each such piston chamber. Still another arrangement involves a rotary member carrying a plurality of radial cylinders, which receive pistons mounted by articulating linkage on an adjacent, parallel-axis rotary member.

These engines, in one or more respects in each instance, incorporate objectionable features. For example, they are structurally unstable and flimsy, prone to damage under high speed or high load conditions, or they are unduly complex and expensive in regard to ignition and fuel supply provisions, or they are unduly large in size, thus actually unsuited for use as a modern day internal combustion prime mover, or otherwise have drawbacks which have resulted in lack of commercial acceptance. It is, therefore, a general object of the invention to provide an improved rotary internal combustion engine which eliminates these disadvantages, by reason of its improved characteristics mentioned in the initial paragraph.

More specifically, the improvement of the invention affords an internal combustion prime mover which has but two moving parts, in the form of a combustion chamber rotor and a piston-type output rotor carried on closely adjacent parallel shafts in the interest of conservation of space. In accordance with the invention, the combustion chamber rotor is formed to provide a plurality (for example, four as herein illustrated) of combustion chambers in equal circumferential spacing about the rotor axis, these combustion chambers being radially elongated and opening radially outwardly of the rotor periphery, as well as axially outwardly at a side of the rotor. This combustion chamber rotor carries ignition and fuel supply provisions for coaction with external wiring and fuel injection means, and the arrangement is highly compact and inexpensive of production, as will more clearly appear.

The second, piston carrying and driven rotor takes the form of a flat disc of a diameter slightly exceeding that of the combustion chamber rotor, said disc being radially overlapped substantially in relation to the other rotor, and in an axially sealed, sliding engagement with the axial face of the latter at which the combustion chambers are exposed, so as, in effect, to seal off this axially facing chamber side. The disc referred to has a plurality, instanced as four, of cylindrical members projecting from one axial side thereof in parallel relation to the axes of the disc and combustion chamber rotors, being in equally spaced, circumferential relation to one another. Each such member serves in the manner of a piston or plunger in the operation of the rotors, in that they enter radially into the combustion chambers successively, compress a fuel mixture previously injected into the chamber and, upon ignition and combustion of the charge at a point just past dead center, are impelled radially outwardly, with attendant rotation of the output rotor in a direction opposite that of the combustion chamber rotor.

As schematically illustrated herein, the combustion chamber rotor carries an ignition device, in the form of a spark plug, for each of its radially disposed chambers, adjacent the radially inner end of the latter (although compression ignition is also contemplated); and this rotor also has passages for the supply of gasoline or other fuel, preferably by force injection. The plugs and passages, in each rotation of the combustion chamber member, pass respectively over a battery or generator supplied contact on a supporting surface, and over a fuel injection passage opening through that surface, and located in a zone at which the cylindrical piston- or plunger-like member radially enters the combustion chamber, for the ensuing compression, ignition and combustion of the fuel mixture referred to in the preceding paragraph, air for the combustion mixture being available where the chambers are exposed from above. These arrangements contribute great compactness to the engine.

In further accordance with the invention, suitable pinion and gear or equivalent arrangements are made to connect the combustion chamber rotor for initial drive by a self-starter, and to connect the driven piston disc to an output or outer-takeoff shaft. Likewise, simple provision is made to discharge the products of combustion through an appropriate manifold portion of a housing in which the drive and driven rotors are enclosed.

Figure 2:
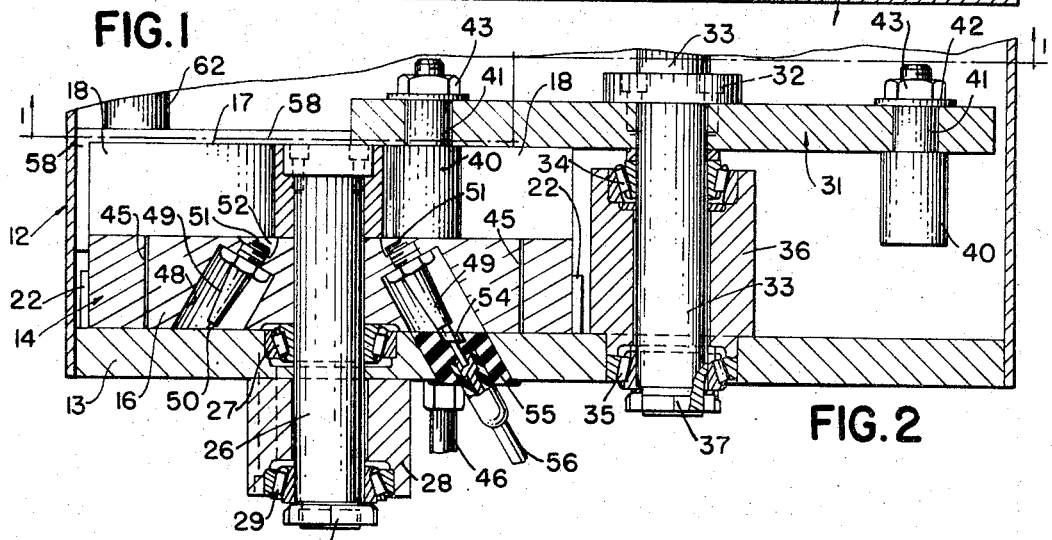
Figure 3:
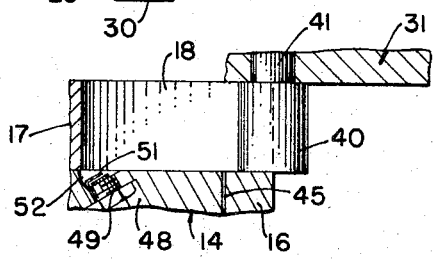

The foregoing as well as other objects will become more apparent as this description proceeds, especially when considered in connection with the accompanying drawing illustrating the invention, wherein:

FIG. 1 is a schematic view, partially broken away and in horizontal section on broken line 1—1 of FIG. 2, showing the above described rotor features and relationships, as viewed in top plan, the view also having certain positional relationships of a piston member and combustion chamber indicated in dot-dash lines FIG. 2 is a fragmentary view in vertical section along line 2—2 of FIG. 1, both FIGS. 1 and 2 showing the piston member in full compression position, just prior to firing of the fuel mixture; and FIG. 3 is a fragmentary view in vertical section along line 3—3 of FIG. 1, showing the driving and driven members in a radial zone at which the piston member of the output rotor has just entered a combustion chamber of the driving rotor, commencing the compression of fuel mixture in the latter; and this view will also represent the relative position of the parts approximately at the completion of fuel explosion.

The operating parts of the motor of the invention, which is generally designated by the reference numeral 10, are housed in their entirety in a sheet metal or cast housing 12 of rectangular cross sectional outline which, of course, will have appropriate provisions (not shown) for suitably mounting the same on a vehicle of one sort or another to be driven, whether an automobile, marine craft or aircraft, with suitable arrangements for either a front wheel or rear wheel drive in an automotive installation. Housing 12 includes a rigid horizontal bottom plate 13 of substantial thickness, which carries various rotor-mounting, ignition and fuel supply provisions, to be described. It will, naturally, be equipped with an appropriate removable cover (not shown); and other means of access to its interior for one purpose or another are also contemplated.

The driving rotor of engine 10, generally designated 14, is in the form of a relatively massive block of circular outline and substantial axial thickness. It rests directly on the top surface of housing bottom 13; and its weight alone, coupled with combustion pressure from above, may well suffice to afford a gas pressure-tight sliding seal at the bottom of rotor block 14, although suitable further sealing means are contemplated, if found desirable or necessary.

Rotor 14 is represented in the drawing as comprising a lower cylindrical portion 16 and an upper coaxial portion 17 of equal diameter, which is in the general form of the wheel of a Geneva drive assembly. That is, it is formed at equally spaced points about the periphery thereof to provide pairs of diametrically opposed slots 18 which are of substantial radial width, these slots serving, as indicated above, as combustion chambers. Typically, four are shown in the illustrated embodiment of motor 10, although more (and possibly even three) are contemplated. As shown in FIG. 2, the slotted combustion chambers 18 are cut entirely through the axial dimension of upper rotor part 17, which is fixedly secured to the lower part 16 for rotation therewith as a unit, as by a series of Allen-type bolts 19 received in counterbored holes 20 through rotor member 17. However, it is contemplated that driving rotor 14 may be of one-piece construction, appropriately routed and finished to provide the radial combustion chambers 18. They open outwardly through the outer periphery of the rotor as well as axially outwardly and upwardly of the latter. Rotor 14 may be provided about its periphery, adjacent the bottom thereof, with gear teeth 22 meshing with the teeth of a small pinion 23 appropriately journaled in housing bottom plate 13; and the shaft 24 of this pinion is connected suitably for drive by a conventional self-starter (not shown).

With reference to FIG. 2, driving rotor 14 of the engine is fixedly connected to an upright stem or spindle 26, which extends downwardly through housing bottom plate 13, being journaled by a taper bearing 27; and for desired stability of journaling, the plate 13 fixedly carries a depending block 28, bolted or otherwise connected to the plate, with a second taper bearing 29 interposed between the block and spindle 26. A retainer nut 30 on the bottom of stem 26 provides means for taking up and holding the bearings 27, 29 against end play under or as the result of vibration.

The driven rotor of engine 10, generally designated 31, is in the form of a horizontal circular plate or disc of substantial axial thickness, and in a diameter somewhat exceeding that of driving rotor 14. Disc 31 is secured by bolts 32 to a second upright, driven stem or spindle 33, which is journaled by upper and lower bearings 34, 35, respectively, in a tubular upright block 36 on housing bottom plate 13, the bearings 34, 35 being similar to drive spindle bearings 27, 29, and being taken up and held by a retainer nut 37. The driven spindle 33 parallels driving spindle 26 at a lateral distance from the latter such that the driven or output disc 31 radially overlaps combustion chamber rotor 14 almost to the axis of the latter, having a rotatively sliding engagement with rotor 14 from above which affords a gas-tight seal of the radial combustion chambers 18, as indicated in FIG. 2. Appropriate means to enhance this seal are contemplated, if desirable or necessary. Driven spindle 33 extends upwardly through disc 31, and has suitable provisions (not shown) to drivingly couple the same with the traction unit of the vehicle, as through a differential, speed reducer, or the like (also not shown). Fuel supply, ignition and full combustion take place in the radially inwardly and axially outwardly sealed area of overlap of rotors 14 and 31.

The output structure, including disc 31, is completed by a circumferential series of four depending driven elements 40 of cylindrical form, which, as indicated above, serve as pistons or plungers coacting with the combustion chambers 18. Each cylinder member 40 (hereinafter referred to for simplicity as a piston) has a reduced diameter upper neck 41 extending through a hole in driven disc 31, with a washer 42 and nut 43 applied to the threaded upper extremity of the piston. The invention also contemplates appropriate bearing means at the reduced neck 41, whereby the piston 40 may individually rotate in respect to disc 31.

The diameter of each piston 40 is such that the latter has a close tolerance sliding or rolling fit in any one of the radial combustion chambers 18, which are, of course, of equal width throughout the length thereof. Thus, as illustrated in FIGS. 1 and 2, the piston 40 may enter a combustion chamber initially, as indicated in the upper dot-dash line representation in FIG. 1, then travel radially inwardly almost to the radial inner end of the chamber, then, upon ignition and combustion of a fuel mixture in the latter, travel radially outwardly, as indicated in lower dot-dash line in FIG. 1, exiting from the combustion chamber 18 under strong rotative drive to correspondingly drive disc 31 and output spindle 33. The clockwise and counterclockwise directions of rotation of driving rotor 14 and driven rotor 31, respectively, are indicated by arrows in FIG. 1.

A charge of gasoline or other fuel (Diesel or gaseous being also contemplated) is brought into each combustion chamber 18 directly after a piston 40 of driven disc 31 has entered the radial mouth of the chamber, i.e., in the position of the parts indicated in the upper dot-dash lines of FIG. 1, as indicated above, preferably by injection through an upright passage 45 (FIG. 3) through the lower part 16 of driving rotor 14, and through a passage (not shown) in housing bottom plate 13 which is supplied by injection through a fuel line 46 shown in FIG. 2. This, of course, occurs each time the combustion chamber fuel passage 45 sweeps over the injection passage in plate 13 at the zone referred to above. The fuel injection passages 45 are located adjacent the radially outer extremity of each combustion chamber, but sufficiently within its mouth that the piston 18 has entered into sealing relation to the chamber just prior to the latter's receiving the injection charge.

The lower portion 16 of driving rotor 14 is also bored and counterbored at 48 beneath each combustion chamber, in an upwardly convergent relation to the rotor axis. Each counterbore opening 48 threadedly receives a spark plug 49 having a lower contactor 50 exposed at the bottom of the opening to sweep around the top of housing plate 13. The plugs 49 are centered between the sides of the combustion chamber 18, and the sparking terminal 51 thereof lies in a small recess 52 (FIG. 2) at the bottom of combustion chamber 18 adjacent the radially inner end of the chamber.

At a point just a few degrees past dead center position, i.e., past a theoretical line through the axes of rotors 14 and 31 in the counterclockwise direction, the spark plug contact or terminal 50 sweeps over an electrical contact 54 embedded in an insulating block 55 inserted in plate 13. Contact 54 is appropriately wired to an electrical lead 56 from an appropriate ignition system (not shown).

Thus, the fuel mixture previously injected in the combustion chamber 18, and compressed by the piston 40 in its radial sweep inwardly, is ignited and explodes to drive piston 40 in the manner referred to above. The number of pistons and combustion chambers may be increased as desired to improve smoothness of action, which proceeds continuously, in any event, as the explosion cycle repeats. There is always a piston 40 within a combustion chamber to produce and react from said cycle. As indicated above, the nature of the invention is such that it admits of Diesel compression ignition, since the compression ratio of combustion chambers 18 may be readily designed as desired. Use of a gaseous fuel is also contemplated.

Although provisions for exhausting the products of combustion may be of various types, a suggested arrangement is the provision of a manifold chamber 58 in sealed relation to the housing and located to extend from a point A (FIG. 1) where the peripheries of rotors 14 and 31 inwardly intersect in their rotation in a manifold portion 51 about the periphery of driving rotor 14 in a counterclockwise direction to a point B, the manifold 58 extending outwardly from these points to sealed connection to the walls of housing 12. The outer ends of combustion chambers 18 sweep past a circumferentially elongated opening 60 in the arcuate manifold portion 59, which is otherwise in sealing engagement with the periphery of rotor 14, just above and below the portion 17 of the latter in which the combustion chambers 18 are formed, as indicated in FIG. 2. An appropriate exhaust pipe 62 is shown in FIG. 2 as communicating downwardly with the space in manifold 58; and this pipe may communicate upwardly with a suitable exhaust blower (not shown) for the force discharge of products of combustion as each chamber 18 sweeps past manifold 58. Other exhaust provisions are, of course, contemplated, and will suggest themselves to those having ordinary skill in the art.

It is seen therefore that the engine 10 of the invention has admirable simplicity and compactness of parts, and is extremely rugged, as well as stably journaled. It is adapted particularly well for compact car installations, as well as marine and aircraft; and simple adaptation provisions alone are required to interconnect it with an existing fuel supply, ignition and propulsion systems of the vehicle.

What I claim as my invention is:

1. A rotary internal combustion engine, comprising driving and driven rotors mounted on parallel, transversely spaced axes for movement in opposite rotative directions, said rotors having a substantial radial overlap on one another and being in rotatively sliding, sealed engagement in the area of overlap, one of said rotors having a plurality of radially outwardly extending combustion chambers opening through its periphery and exposed at the axial side thereof at which the rotors overlap, the other rotor sealing the combustion chambers axially in the area of overlap and being provided with a plurality of axially extending pistons entering and departing from said chambers in said area, and individual means on and rotating with said one rotor in communication with the respective combustion chambers thereof to produce combustion of fuel in said chambers in a phase between the entry and departure of said pistons.

2. The motor of claim 1, in which said last named means comprises fuel supply passages through said one rotor discharging to each combustion chamber during said phase.

3. The motor of claim 1, in which said last named means comprises spark-type ignition devices housed within said one rotor and exposed to the chamber during said phase.

4. The motor of claim 1, in which said last named means comprises fuel supply passages through said one rotor discharging to each combustion chamber during said phase, and spark-type ignition devices housed within said one rotor and exposed to the chamber during said phase.

5. The motor of claim 4, in which said fuel supply passages discharge to each combustion chamber during said phase at a point relatively remote from the radially inner end thereof for compression of the fuel by a piston, said ignition devices being exposed to the chamber during said phase adjacent the radially inner end thereof.

6. The motor of claim 1, in which said combustion chamber rotor is slidably supported on a fixed plate member, said plate member having a fuel passage periodically communicated with said passages in said chamber rotor during said phase.

7. The motor of claim 4, in which said combustion chamber rotor is slidably supported on a fixed plate member, said plate member having a fuel passage periodically communicated with said passages in said chamber rotor during said phase, and a fixed electrical contact periodically engaged by said ignition devices during said phase.

References Cited

UNITED STATES PATENTS 985,907  3/1911  Jones _____ 123—12

FOREIGN PATENTS 354,882  8/1931  Great Britain.

MARK M. NEWMAN, *Primary Examiner.*

WENDELL E. BURNS, *Examiner.*